(12) United States Patent  
Lariviere et al.

(10) Patent No.: US 8,984,891 B2  
(45) Date of Patent: Mar. 24, 2015

(54) FLADE DISCHARGE IN 2-D EXHAUST NOZZLE

(75) Inventors: Erin Lee Lariviere, Milford, OH (US); Stephen Michael Ettorre, Morrow, OH (US)

(73) Assignee: General Electric Company, Schenectady, NY (US)

( * ) Notice: Subject to any disclaimer, the term of this patent is extended or adjusted under 35 U.S.C. 154(b) by 1075 days.

(21) Appl. No.: 12/982,265

(22) Filed: Dec. 30, 2010

(65) Prior Publication Data

US 2012/0167549 A1    Jul. 5, 2012

(51) Int. Cl.
| | |
|---|---|
| F02K 1/00 | (2006.01) |
| F02K 1/82 | (2006.01) |
| F02C 9/20 | (2006.01) |
| F02K 1/08 | (2006.01) |
| F02K 1/10 | (2006.01) |
| F02K 3/072 | (2006.01) |
| F02K 3/075 | (2006.01) |
| F02K 3/077 | (2006.01) |
| F02K 3/10 | (2006.01) |
| F02K 7/16 | (2006.01) |

(52) U.S. Cl.
CPC ... *F02K 1/82* (2013.01); *F02C 9/20* (2013.01); *F02K 1/08* (2013.01); *F02K 1/10* (2013.01); *F02K 3/072* (2013.01); *F02K 3/075* (2013.01); *F02K 3/077* (2013.01); *F02K 3/10* (2013.01); *F02K 7/16* (2013.01)
USPC .................. 60/772; 60/770; 60/226.1; 60/761

(58) Field of Classification Search
CPC .............. F02C 9/20; F02K 1/08; F02K 1/10; F02K 1/82; F02K 3/072; F02K 3/075; F02K 3/077; F02K 3/10; F02K 7/16

USPC ................ 60/226.1, 262, 761, 771, 782, 785; 415/77, 79; 416/175, 193 R, 194, 203, 416/196 R
See application file for complete search history.

(56) References Cited

U.S. PATENT DOCUMENTS

| | | | |
|---|---|---|---|
| 4,043,121 A | 8/1977 | Thomas et al. | |
| 4,043,508 A * | 8/1977 | Speir et al. | ............... 239/265.19 |
| 5,261,227 A | 11/1993 | Giffin, III | |

(Continued)

FOREIGN PATENT DOCUMENTS

EP         0567277 A1    10/1993

*Primary Examiner* — Phutthiwat Wongwian  
*Assistant Examiner* — Marc J Amar  
(74) *Attorney, Agent, or Firm* — General Electric Company; Pamela A. Kachur

(57) ABSTRACT

An aircraft gas turbine engine has a row of FLADE fan blades disposed radially outwardly of and drivingly connected to a fan in the engine's fan section. The FLADE fan blades extend across a FLADE duct circumscribing the fan section. A two dimensional air discharge passage is in fluid flow communication with the FLADE duct and with FLADE air upstream and downstream discharge slots in a divergent flap of a two dimensional exhaust nozzle. A valve fully closes the upstream slot when the downstream slot is fully opened and fully opens the upstream slot when the downstream slot is fully closed. The upstream and downstream slots may be located upstream and downstream respectfully of a nozzle discharge area in the nozzle. A sliding deck slides aft or down to open upstream slot and close downstream slot and slides forward or up to close upstream slot and open downstream slot.

32 Claims, 3 Drawing Sheets

(56) References Cited

U.S. PATENT DOCUMENTS

| | | |
|---|---|---|
| 5,402,963 A | 4/1995 | Carey et al. |
| 5,404,713 A | 4/1995 | Johnson |
| 6,857,600 B1 | 2/2005 | Walker et al. |
| 6,948,317 B2 | 9/2005 | Renggli et al. |
| 7,144,221 B2 | 12/2006 | Giffin |
| 7,188,467 B2 | 3/2007 | Johnson |
| 7,395,657 B2 | 7/2008 | Johnson |
| 7,475,545 B2 | 1/2009 | Johnson |
| 7,509,797 B2 | 3/2009 | Johnson |
| 7,770,381 B2 | 8/2010 | Johnson et al. |
| 2005/0081509 A1* | 4/2005 | Johnson ................ 60/226.1 |
| 2006/0096272 A1 | 5/2006 | Baughman et al. |

* cited by examiner

FLADE DISCHARGE IN 2-D EXHAUST NOZZLE

BACKGROUND OF THE INVENTION

1. Field of the Invention

This invention relates to FLADE aircraft gas turbine engines and, more particularly, to exhaust nozzles of such engines.

2. Description of Related Art

One particular type of variable cycle engine called a FLADE engine (FLADE being an acronym for fan on blade) is characterized by an outer fan connected to and thus driven by a radially inner fan and discharging its flade air into an outer fan duct which is generally co-annular with and circumscribes an inner fan duct circumscribing the inner fan. One such engine disclosed in U.S. Pat. No. 4,043,121, entitled "Two Spool Variable Cycle Engine", by Thomas et al., provides a flade fan and outer fan duct within which variable guide vanes control the cycle variability by controlling the amount of air passing through the flade outer fan duct.

Other high performance aircraft variable cycle gas turbine FLADE engines capable of maintaining an essentially constant inlet airflow over a relatively wide range of thrust at a given set of subsonic flight ambient conditions such as altitude and flight Mach No. in order to avoid spillage drag and to do so over a range of flight conditions have been studied. This capability is particularly needed for subsonic part power engine operating conditions. Examples of these are disclosed in U.S. Pat. No. 5,404,713, entitled "Spillage Drag and Infrared Reducing Flade Engine", U.S. Pat. No. 5,402,963, entitled "Acoustically Shielded Exhaust System for High Thrust Jet Engines", U.S. Pat. No. 5,261,227, entitled "Variable Specific Thrust Turbofan Engine", and European Patent No. EP0567277, entitled "Bypass Injector Valve For Variable Cycle Aircraft Engines". U.S. Pat. No. 7,770,381, entitled "Duct burning mixed flow turbofan and method of operation", discloses the use of airflow from a FLADE fan stage may be discharged into an interior space of an exhaust nozzle to cool the nozzle surfaces, and then ejected through a slot or in the exhaust nozzle to provide some supplemental thrust.

It is highly desirable to provide an engine with apparatus for introducing FLADE air into the exhaust nozzle airflow that maximizes thrust for a wide range of aircraft operation. Variation in the nozzle exit area is important for attaining high performance across the flight envelope, however, this is in conflict with airframe designers objectives to maintain a fixed structure for low observable and mechanical reasons. Thus, it is also desirable to provide a FLADE engine with fixed exit area and fixed outer structure and engine envelope.

SUMMARY OF THE INVENTION

An aircraft gas turbine engine has a row of FLADE fan blades disposed radially outwardly of and drivingly connected to a fan in a fan section. The FLADE fan blades radially extend across a FLADE duct circumscribing the fan section, a two dimensional flow FLADE air discharge fluid passage in fluid flow communication with the FLADE duct, and FLADE air upstream and downstream discharge slots in a divergent flap of a two dimensional exhaust nozzle of the engine are in fluid flow communication with the two dimensional flow FLADE air discharge fluid passage.

An exemplary embodiment of the engine includes a valve which opens and closes the upstream and downstream discharge slots. A flade air discharge the system is operable for fully closing the upstream slot when the downstream slot is fully opened and fully opening the upstream slot when the downstream slot is fully closed. The system may be operable for partially opening and partially closing the upstream and downstream slots. The upstream and downstream slots are located upstream and downstream respectfully of a nozzle discharge area in the two dimensional exhaust nozzle.

The nozzle discharge area may be fixed or variable.

An exemplary embodiment of the valve includes a sliding deck operable for sliding aft and forward for opening and closing the upstream and downstream discharge slots wherein the sliding deck is slid aft to an aft position when the upstream slot is opened and the downstream slot is closed and the sliding deck is slid forward to a forward position when the upstream slot is closed and the downstream slot is opened.

Another exemplary embodiment of the valve includes a sliding deck operable for sliding up and down for opening and closing the upstream and downstream discharge slots wherein the sliding deck is slid down to a lower position when the upstream slot is opened and the downstream slot is closed and the sliding deck is slid up to an upper position when the upstream slot is closed and the downstream slot is opened.

Another exemplary embodiment of the engine includes a gas turbine engine including a fan section, at least one row of FLADE fan blades disposed radially outwardly of and drivingly connected to a fan in the fan section, and a core engine downstream of the fan section. The core engine includes a high pressure compressor, a combustor, and a high pressure turbine, a low pressure turbine downstream of the core engine and a transition section downstream of the low pressure turbine and operable for converting axisymmetric gas flow from the low pressure turbine to two-dimensional gas flow for a two-dimensional exhaust nozzle which may be a two-dimensional single expansion ramp exhaust nozzle.

The row of FLADE fan blades radially extend across a FLADE duct circumscribing the fan section, an afterburner is disposed in an engine exhaust duct between the low pressure turbine and the transition section, a two dimensional flow FLADE air discharge fluid passage is in fluid flow communication with the FLADE duct, and FLADE air upstream and downstream discharge slots are disposed in a divergent flap of the two dimensional exhaust nozzle and in fluid flow communication with the two dimensional flow FLADE air discharge fluid passage.

A method for operating the slots includes fully opening the upstream slot and fully closing the downstream slot when operating the engine in a lower nozzle pressure ratio mode of operation and fully closing the upstream slot and fully opening the downstream slot when operating the engine in a higher nozzle pressure ratio mode of operation. In a more particular method the lower nozzle pressure ratio mode of operation is cruise and the higher nozzle pressure ratio mode of operation is afterburning including burning fuel in an afterburner upstream of the two-dimensional single expansion ramp nozzle.

BRIEF DESCRIPTION OF THE DRAWINGS

The foregoing aspects and other features of the invention are explained in the following description, taken in connection with the accompanying drawings where.

DETAILED DESCRIPTION OF THE INVENTION

Figure 1:
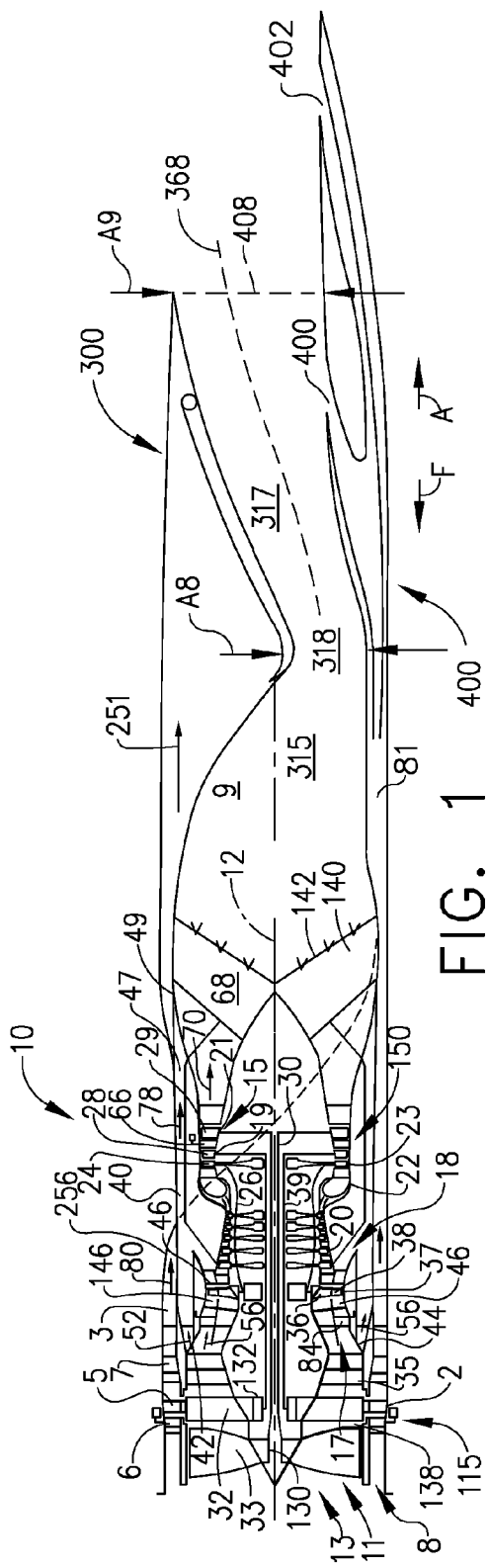
FIG. 1 is a schematical cross-sectional view illustration of a first exemplary embodiment of a FLADE aircraft gas turbine engine with upstream and downstream FLADE air injection slots in a divergent section of a fixed exit area SERN nozzle.

Schematically illustrated in cross-section in FIG. 1 is an exemplary aircraft "fan-on-blade" or FLADE engine 10 with a two-dimensional exhaust nozzle illustrated herein as a single expansion ramp nozzle referred to herein as a SERN 300. The engine 10 is a variable cycle engine and is described in greater detail in U.S. Pat. No. 5,404,713, entitled "Spillage Drag and Infrared Reducing Flade Engine" and U.S. Pat. No. 7,395,657, entitled "Flade Gas Turbine Engine With Fixed Geometry Inlet", both of which are assigned to the General Electric Co., the same assignee as for this patent and both of which are incorporated herein by reference.

A FLADE engine (FLADE being an acronym for "fan on blade") is one particular type of variable cycle engines characterized by an outer fan driven by a radially inner fan and discharging its flade air into an outer fan duct which is generally co-annular with and circumscribes an inner fan duct circumscribing the inner fan.

Figure 2:
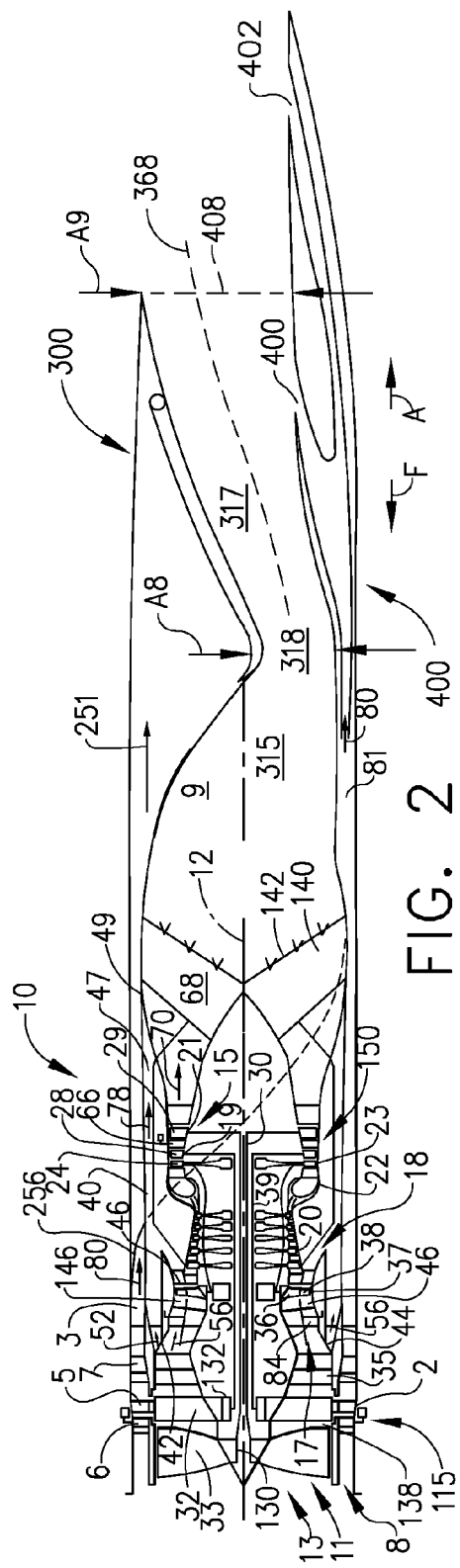
FIG. 2 is a schematical cross-sectional view illustration of a second exemplary embodiment of a FLADE aircraft gas turbine engine with upstream and downstream FLADE air injection slots in a divergent section of a fixed exit area SERN nozzle.

The FLADE fan aircraft gas turbine engine illustrated schematically in FIGS. 1 and 2 include a fan section 115 and at least one row of FLADE fan blades 5 radially extend across a FLADE duct 3 disposed radially outwardly of and circumscribing the fan section 115. An engine inlet 13 includes a fan inlet 11 to the fan section 115 and an annular FLADE inlet 8 to the FLADE duct 3. The FLADE engine 1 illustrated herein includes a counter-rotatable fan has a fan inlet 11 leading to first and second counter-rotatable fans 130 and 132 in the fan section 115. A FLADE fan 2 having at least one row of FLADE fan blades 5 disposed in a FLADE duct 3 through which FLADE airflow 80 is exhausted by the FLADE fan blades 5. The row of FLADE fan blades 5 is disposed radially outwardly of, operably connected to, and driven by one of the first or second counter-rotatable fans 130 and 132.

The second fan 132 is illustrated as being FLADE fan 2 having the row of FLADE fan blades 5 disposed between an axially forward row of variable first FLADE vanes 6 and an axially aft row of variable second FLADE vanes 7. The axially forward row of variable first FLADE vanes 6 and the axially aft row of variable second FLADE vanes 7 are used to control the amount of FLADE airflow 80 allowed into the FLADE inlet 8 and the FLADE duct 3. The second FLADE vanes 7 are illustrated as being variable but may be fixed. The FLADE fan 2 is disposed downstream of an annular FLADE inlet 8 to the FLADE duct 3. The FLADE inlet 8 and the fan inlet 11 in combination generally form the engine inlet 13. Downstream and axially aft of the first and second counter-rotatable fans 130 and 132 is a core engine 18 (also referred to as a gas generator) having an annular core engine inlet 17 and a generally axially extending axis or centerline 12. A fan bypass duct 40 located downstream and axially aft of the first and second counter-rotatable fans 130 and 132 circumscribes the core engine 18. The FLADE duct 3 circumscribes the first and second counter-rotatable fans 130 and 132 and the fan section 115.

The core engine 18 includes, in downstream serial axial flow relationship, a core driven fan 37 having a row of core driven fan blades 36, a high pressure compressor 20, a combustor 22, and a high pressure turbine 23 having a row of high pressure turbine blades 24. A high pressure shaft 26, disposed coaxially about the centerline 12 of the engine 10, fixedly interconnects the high pressure compressor 20 and the high pressure turbine blades 24. The core engine 18 is effective for generating combustion gases. Pressurized air from the high pressure compressor 20 is mixed with fuel in the combustor 22 and ignited, thereby, generating combustion gases. Some work is extracted from these gases by the high pressure turbine blades 24 which drives the core driven fan 37 and the high pressure compressor 20.

The combustion gases are discharged from the core engine 18 into a low pressure turbine section 150 having counter-rotatable first and second low pressure turbines 19 and 21 with first and second rows of low pressure turbine blades 28 and 29, respectively. The second low pressure turbine 21 is drivingly connected to the first counter-rotatable fan 130 by a first low pressure shaft 30. The first low pressure turbine 19 is drivingly connected to the second counter-rotatable fan 132 by a second low pressure shaft 31.

The second counter-rotatable fan 132 has a single row of generally radially outwardly extending and circumferentially spaced-apart second fan blades 32. The first counter-rotatable fan 130 has a single row of generally radially outwardly extending and circumferentially spaced-apart first fan blades 33. The FLADE fan blades 5 are primarily used to flexibly match inlet airflow requirements.

A first bypass inlet 42 to the fan bypass duct 40 is disposed axially between the second counter-rotatable fan 132 and the annular core engine inlet 17 to the core engine 18. A row of circumferentially spaced-apart first fan stator vanes 35 is radially disposed across the first fan duct 138, downstream of the first and second counter-rotatable fan 130 and 132, and axially between the second counter-rotatable fan 132 and the first bypass inlet 42 to the fan bypass duct 40.

The first fan duct 138 contains the first and second counter-rotatable fans 130 and 132 including the first and second fan blades 33 and 32 and the row of circumferentially spaced-apart first fan stator vanes 35. The first fan stator vanes 35 may not be needed. The row of the core driven fan blades 36 of the core driven fan 37 are radially disposed across an annular second fan duct 142. A front variable area bypass injector (VABI) door 44 controls split of air passing through the first bypass inlet 42 and through the core driven fan 37 and its row of core driven fan blades 36.

A second bypass airflow portion 56 is directed through a fan tip duct 146 across the vane tip sections 84 of the core driven fan stator vanes 34 and across the blade tip sections 38 of the core driven fan blades 36 into a second bypass inlet 46 of a second bypass duct 58 to the fan bypass duct 40. A fan bypass duct outlet 47 is disposed axially aft of the second inlet 46 and includes a mixer 49 for mixing the bypass airflow 78 with core discharge airflow 70 from the core engine in the engine exhaust duct 68. Downstream of the mixer 49 and the low pressure turbine 19 is an augmentor or afterburner 140 including fuel spray bars 142 in the engine exhaust duct 68 and upstream of the transition section 9.

Aft and downstream of the low pressure turbine 19 is an engine exhaust duct 68 followed in downstream serial flow relationship by a transition section 9 and the SERN 300. The transition section 9 converts the axisymmetric gas flow in the circular cross section engine exhaust duct 68 to two-dimensional gas flow for the two-dimensional single expansion ramp nozzle (SERN 300).

Most or all of the FLADE airflow 80 is directed through a two dimensional flow FLADE air discharge fluid passage 81 to one of FLADE air upstream and downstream discharge slots 400, 402 respectively in a divergent flap of the SERN 300. A scroll 256 is used to direct all of the FLADE airflow 80 to the FLADE air discharge fluid passage 81 as illustrated in FIG. 1.

Some of the FLADE airflow 80 may be flowed as cooling air 251 for internal cooling and/or film cooling over hot surfaces of the nozzle as illustrated in FIG. 2. A scroll 256 may be used to flow most but not all of the FLADE airflow 80 to the FLADE air discharge fluid passage 81 as illustrated in FIG. 2.

Referring to FIG. 1, the SERN 300 is a convergent divergent two-dimensional gas turbine engine exhaust nozzle. The SERN 300 is a convergent/divergent nozzle illustrated as having convergent and divergent sections 315, 317 and a variable area throat 318 therebetween also often referred to as a variable A8. The divergent section 317 includes transversely spaced apart upper and lower divergent flaps 358, 360, respectively, extending longitudinally downstream along a nozzle centering 368, and disposed between two widthwise spaced apart first and second sidewalls not illustrated herein.

The nozzle is described in terms of upper and lower elements and upward and downward directions. This is for purpose of convenience and upper and lower flaps and other elements may be reversed. There are embodiments of the nozzle wherein the nozzle installation is upside down with respect to the embodiments illustrated herein. The choice of upper and lower is for ease of description.

The upper and lower divergent flaps 358, 360 have inwardly facing upper and lower flap surfaces 374, 376, respectively, which together with the sidewalls define, at least a part, an exhaust stream flowpath 380 therebetween. The lower divergent flap 360 has an expansion ramp 388 diverging away from the nozzle axis 368. A flade air discharge system 410 includes the upstream and downstream discharge slots 400, 402 in the lower divergent flap 360 being axially spaced forward and aft and upstream and downstream respectively of a nozzle discharge area 408 also often referred to as A9. The nozzle discharge area 408 is axially located at an upper flap trailing edge 359 of the upper divergent flap 358 and upstream and axially forward of a lower flap trailing edge 361 of the lower divergent flap 360. The nozzle discharge area 408 is fixed in the embodiment of the SERN 300 illustrated in FIGS. 1-5 while the SERN 300 illustrated in FIGS. 6-8 have a variable nozzle exit that is capable of varying the nozzle discharge area 408 during the engine's operation.

Figure 3:
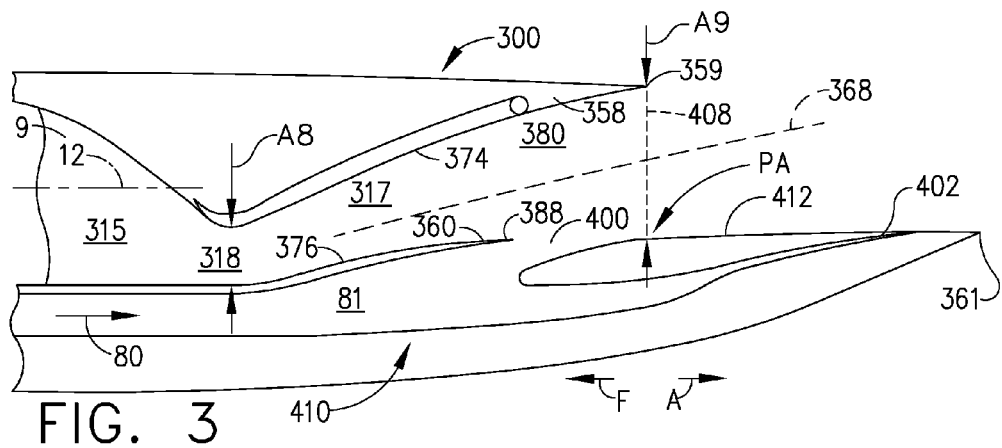
FIG. 3 is a schematical cross-sectional view illustration of the nozzle in FIG. 1 with the upstream slot open and the downstream slot closed.
Figure 4:
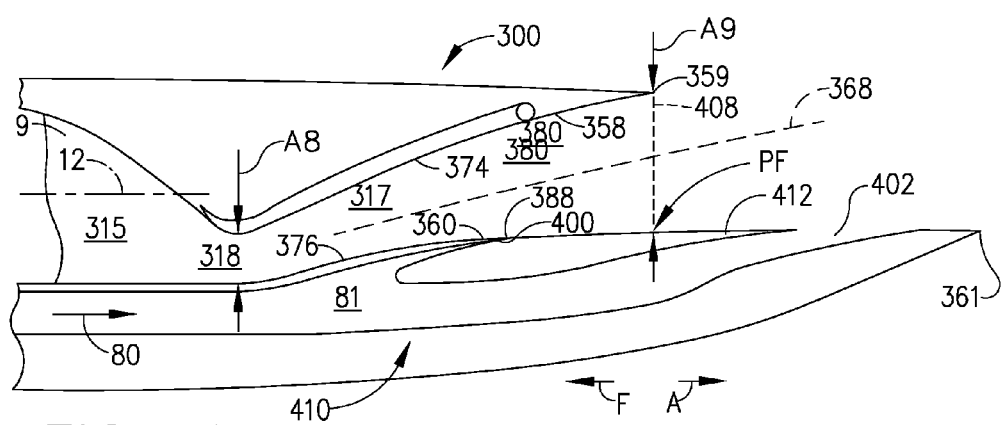
FIG. 4 is a schematical cross-sectional view illustration of the nozzle in FIG. 1 with an upstream slot closed and a downstream slot open.
Figure 6:
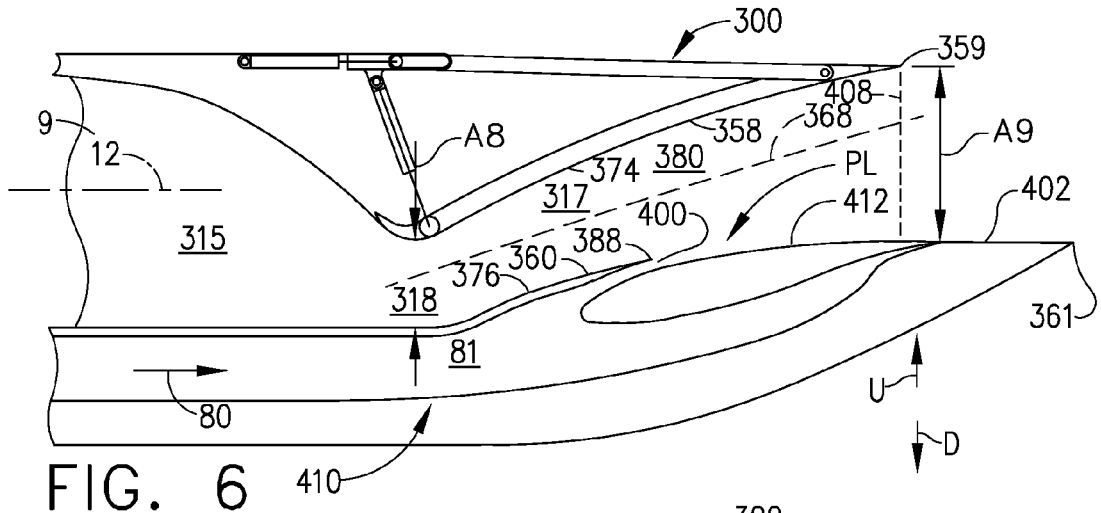
FIG. 6 is a schematical cross-sectional view illustration of a second exemplary embodiment of a variable exit area SERN nozzle with upstream and downstream FLADE air injection slots in a divergent section of the nozzle and the upstream slot open.
Figure 7:
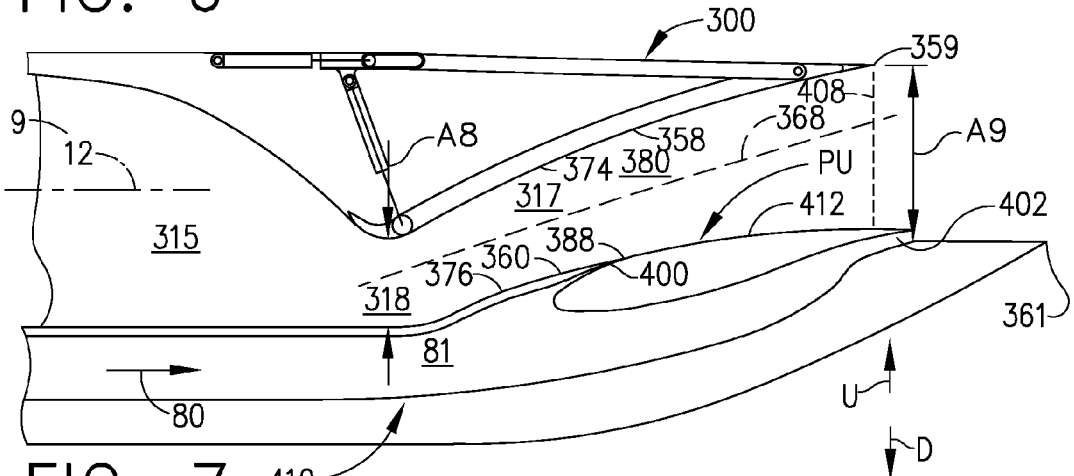
FIG. 7 is a schematical cross-sectional view illustration of the nozzle in FIG. 6 with upstream and downstream slots open.

The discharge system 410 controls opening and closing of the upstream and downstream discharge slots 400, 402. The upstream slot 400 is opened and the downstream slot 402 is closed for lower nozzle pressure ratio (NPR) operation (e.g. cruise) as illustrated in FIGS. 3 and 6. The downstream slot 402 is opened and the upstream slot 400 is closed for higher NPR operation (e.g. afterburner mode) as illustrated in FIGS. 4 and 7. The discharge system 410 incudes a valve for opening and closing of the upstream and downstream discharge slots 400, 402.

The valve is illustrated herein as a sliding deck 412. The sliding deck 412 illustrated in FIGS. 1-5 slides forward F and aft A for opening and closing of the upstream and downstream discharge slots 400, 402. The sliding deck 412 is slid aft to an aft position PA when the upstream slot 400 is opened and the downstream slot 402 is closed as illustrated in FIG. 3. The sliding deck 412 is slid forward to a forward position PF when the upstream slot 400 is closed and the downstream slot 402 is opened as illustrated in FIG. 4.

Figure 8:
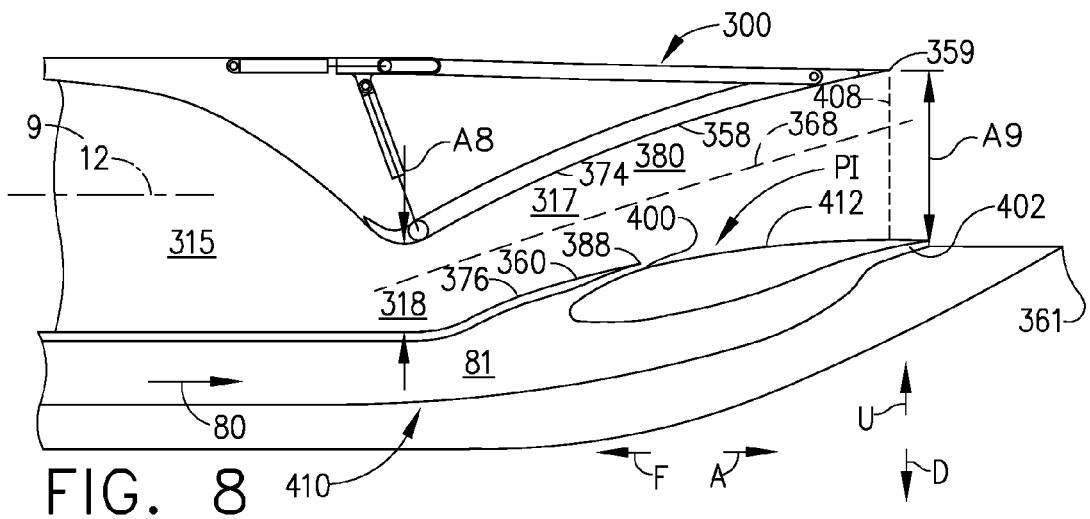
FIG. 8 is a schematical cross-sectional view illustration of the nozzle in FIG. 6 with the upstream slot closed and the downstream slot open.

The sliding deck 412 illustrated in FIGS. 6-8 slides up U and down D for opening and closing of the upstream and downstream discharge slots 400, 402. The sliding deck 412 is slid down to a lower position PL when the upstream slot 400 is opened and the downstream slot 402 is closed as illustrated in FIG. 6. The sliding deck 412 is slid up to an upper position PU when the upstream slot 400 is closed and the downstream slot 402 is opened as illustrated in FIG. 7. The sliding deck 412 may be positioned at an intermediate upper position PI when both the upstream slot 400 and the downstream slot 402 are partially opened as illustrated in FIGS. 5 and 8.

Figure 5:
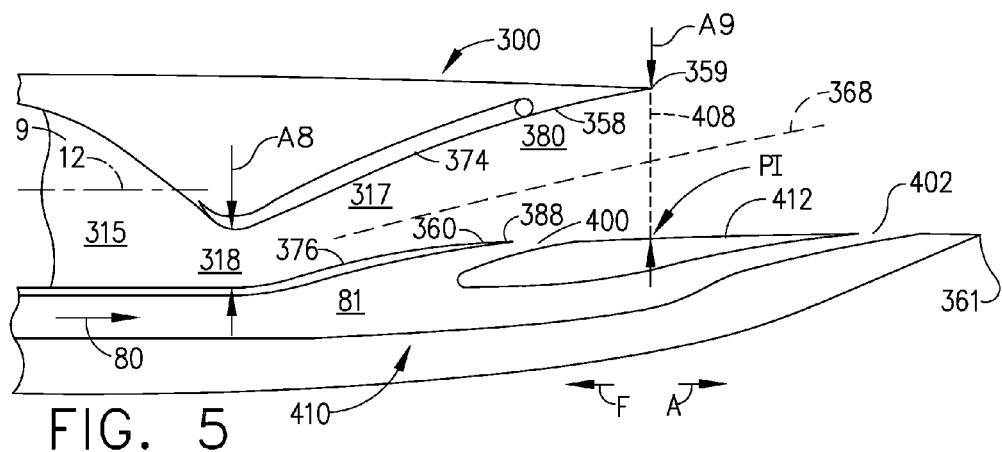
FIG. 5 is a schematical cross-sectional view illustration of the nozzle in FIG. 1 with upstream and downstream slots open.

For the fixed A9 nozzle illustrated in FIGS. 3-5, all the core discharge airflow 70, the bypass airflow 78, and the FLADE airflow 80 is passed through the fixed nozzle exit or discharge area 408 also often referred to as A9 at high nozzle pressure ratio (NPR) conditions when the sliding deck 412 is in the aft position PA and the upstream slot 400 is open and the downstream slot 402 closed. The core discharge airflow 70 and the bypass airflow 78 is passed through the fixed nozzle exit or discharge area 408 at high nozzle pressure ratio (NPR) conditions when the sliding deck 412 is in the forward position PF and the upstream slot 400 is closed and the downstream slot 402 open. Thus at higher NPRs, an effective nozzle discharge area is effectively increased by opening up the downstream slot 402 for discharging all of the FLADE airflow 80 and the higher momentum mixed core discharge airflow 70 and bypass airflow 78 is allowed to discharge through the fixed nozzle exit or discharge area 408 without being mixed with the lower momentum FLADE airflow 80.

The discharge system 410 for a fixed A9 nozzle provides higher thrust over a wider range of aircraft operation than configurations which utilize a single discharge slot. The discharge system 410 effectively varies the area ratio in an exhaust system without incorporating variable A9 nozzle. A fixed A9 system is more appealing to airframers because it eliminates some airframe integration and RCS concerns. In a fixed A9 system, the nozzle exit area is typically set based on one condition (such as subsonic cruise) which results in poor performance at other important conditions (such as supersonic cruise or maximum afterburning). The discharge system 410 for a fixed A9 nozzle reduces or eliminates this poor performance.

A variable A9 nozzle could use the sliding deck illustrated in FIGS. 3-5 for which the discharge system 410 would allow a reduction in the amount of variation of A9 required to achieve a desired nozzle performance.

In a variable A9 nozzle a dual slot system has other uses that make it advantageous. One such use is to set the placement of the slot to optimize a particular key condition such as subsonic cruise. For some cycles, at cruise, the FLADE pressure ratio is high enough to allow placement of the slots anywhere in the divergent section of the nozzle. Aerodynamic and radar cross section (RCS) benefits may be had for an upstream position. However, at other conditions the FLADE pressure ratio would be lower, requiring placement of the slot further downstream. In this situation, it would be ideal to close off an upstream slot, and redirect FLADE air to a downstream slot for off?design conditions. A dual slot system allows maximum aerodynamic and RCS performance of the nozzle and engine at cruise while still allowing the FLADE stream to flow at other conditions. An example of this use in a variable A9 nozzle is illustrated in FIGS. 6-8. In this system, all the core discharge airflow 70, the bypass airflow 78, and the FLADE airflow 80 is passed through the variable nozzle exit or discharge area 408 at high nozzle pressure ratio (NPR) conditions when the sliding deck 412 is in the lower position PL and the upstream slot 400 is open and the downstream slot 402 closed. The core discharge airflow 70 and the bypass airflow 78 is passed through the variable nozzle exit or discharge area 408 at low nozzle pressure ratio (LPR) conditions when the sliding deck 412 is in upper position PU and the upstream slot 400 is closed and the downstream slot 402 open.

While there have been described herein what are considered to be preferred and exemplary embodiments of the present invention, other modifications of the invention shall be apparent to those skilled in the art from the teachings herein and, it is therefore, desired to be secured in the appended claims all such modifications as fall within the true spirit and scope of the invention. Accordingly, what is desired to be secured by Letters Patent of the United States is the invention as defined and differentiated in the following claims.

What is claimed is:

1. An aircraft gas turbine engine comprising:
   a fan section,
   at least one row of FLADE fan blades disposed radially outwardly of and drivingly connected to a fan in the fan section,
   the row of FLADE fan blades radially extending across a FLADE duct circumscribing the fan section,
   an engine inlet including a fan inlet to the fan section and an annular FLADE inlet to the FLADE duct,
   a two dimensional flow FLADE air discharge fluid passage in fluid flow communication with the FLADE duct,
   a FLADE air discharge system including FLADE air upstream and downstream discharge slots in a divergent flap of a two dimensional exhaust nozzle of the engine and in fluid flow communication with the two dimensional flow FLADE air discharge fluid passage, and
   a valve for opening and closing the upstream and downstream discharge slots wherein the valve is operable for fully closing the upstream slot when the downstream slot is fully opened and fully opening the upstream slot when the downstream slot is fully closed.

2. An engine as claimed in claim 1 further comprising the system operable for partially opening and partially closing the upstream and downstream slots.

3. An engine as claimed in claim 1 further comprising the upstream and downstream slots located upstream and downstream respectfully of a nozzle discharge area in the two dimensional exhaust nozzle.

4. An engine as claimed in claim 3 further comprising the system operable for partially opening and partially closing the upstream and downstream slots.

5. An engine as claimed in claim 4 further comprising the nozzle discharge area being fixed or variable.

6. An engine as claimed in claim 1 further comprising the valve including a sliding deck operable for sliding aft and forward for opening and closing the upstream and downstream discharge slots wherein the sliding deck is slid aft to an aft position when the upstream slot is opened and the downstream slot is closed and the sliding deck is slid forward to a forward position when the upstream slot is closed and the downstream slot is opened.

7. An engine as claimed in claim 6 further comprising the system operable for partially opening and partially closing the upstream and downstream slots.

8. An engine as claimed in claim 1 further comprising the valve including a sliding deck operable for sliding up and down for opening and closing the upstream and downstream discharge slots wherein the sliding deck is slid down to a lower position when the upstream slot is opened and the downstream slot is closed and the sliding deck is slid up to an upper position when the upstream slot is closed and the downstream slot is opened.

9. An engine as claimed in claim 8 further comprising the system operable for partially opening and partially closing the upstream and downstream slots.

10. An aircraft gas turbine engine comprising:
    a fan section,
    at least one row of FLADE fan blades disposed radially outwardly of and drivingly connected to a fan in the fan section,
    a core engine downstream of the fan section, the core engine including a high pressure compressor, a combustor, and a high pressure turbine,
    a low pressure turbine downstream of the core engine and a transition section downstream of the low pressure turbine,
    the row of FLADE fan blades radially extending across a FLADE duct circumscribing the fan section,
    an engine inlet including a fan inlet to the fan section and an annular FLADE inlet to the FLADE duct,
    the transition section operable for converting axisymmetric gas flow from the low pressure turbine to two-dimensional gas flow for a two-dimensional exhaust nozzle,
    an afterburner disposed in an engine exhaust duct between the low pressure turbine and the transition section, a two dimensional flow FLADE air discharge fluid passage in fluid flow communication with the FLADE duct,
    a FLADE air discharge system including FLADE air upstream and downstream discharge slots in a divergent flap of the two dimensional exhaust nozzle and in fluid flow communication with the two dimensional flow FLADE air discharge fluid passage, and
    a valve for opening and closing the upstream and downstream discharge slots wherein the valve is operable for fully closing the upstream slot when the downstream slot is fully opened and fully opening the upstream slot when the downstream slot is fully closed.

11. An engine as claimed in claim 10 further comprising the system operable for partially opening and partially closing the upstream and downstream slots.

12. An engine as claimed in claim 10 further comprising the upstream and downstream slots located upstream and downstream respectfully of a nozzle discharge area in the two dimensional exhaust nozzle.

13. An engine as claimed in claim 12 further comprising the system operable for partially opening and partially closing the upstream and downstream slots.

14. An engine as claimed in claim 12 further comprising the nozzle discharge area being fixed or variable.

15. An engine as claimed in claim 10 further comprising the valve including a sliding deck operable for sliding aft and forward for opening and closing the upstream and downstream discharge slots wherein the sliding deck is slid aft to an aft position when the upstream slot is opened and the downstream slot is closed and the sliding deck is slid forward to a forward position when the upstream slot is closed and the downstream slot is opened.

16. An engine as claimed in claim 10 further comprising the valve including a sliding deck operable for sliding up and down for opening and closing the upstream and downstream discharge slots wherein the sliding deck is slid down to a lower position when the upstream slot is opened and the downstream slot is closed and the sliding deck is slid up to an upper position when the upstream slot is closed and the downstream slot is opened.

17. An aircraft gas turbine engine comprising:
a fan section,
at least one row of FLADE fan blades disposed radially outwardly of and drivingly connected to a fan in the fan section, a core engine downstream of the fan section,
the core engine including a high pressure compressor, a combustor, and a high pressure turbine, a low pressure turbine downstream of the core engine and a transition section downstream of the low pressure turbine,
the row of FLADE fan blades radially extending across a FLADE duct circumscribing the fan section, an engine inlet including a fan inlet to the fan section and an annular FLADE inlet to the FLADE duct,
the transition section operable for converting axisymmetric gas flow from the low pressure turbine to two-dimensional gas flow for a two-dimensional single expansion ramp exhaust nozzle,
the single expansion ramp exhaust nozzle including convergent and divergent sections and a variable area throat therebetween,
an afterburner disposed in an engine exhaust duct between the low pressure turbine and the transition section,
a two dimensional flow FLADE air discharge fluid passage in fluid flow communication with the FLADE duct,
a FLADE air discharge system including FLADE air upstream and downstream discharge slots in a lower divergent flap of the divergent section and in fluid flow communication with the two dimensional flow FLADE air discharge fluid passage, and
a valve for opening and closing the upstream and downstream discharge slots wherein the valve is operable for fully closing the upstream slot when the downstream slot is fully opened and fully opening the upstream slot when the downstream slot is fully closed.

18. An engine as claimed in claim 17 further comprising:
an upper divergent flap transversely spaced apart from the lower divergent flap in the divergent section,
the two dimensional single expansion ramp exhaust nozzle including a nozzle discharge area axially located at an upper flap trailing edge of the upper divergent flap, and
the upstream and downstream slots located upstream and downstream respectively of a nozzle discharge area in the two dimensional single expansion ramp exhaust nozzle.

19. An engine as claimed in claim 18 further comprising the system operable for partially opening and partially closing the upstream and downstream slots.

20. An engine as claimed in claim 18 further comprising the nozzle discharge area being fixed or variable.

21. An engine as claimed in claim 18 further comprising the valve including a sliding deck operable for sliding aft and forward for opening and closing the upstream and downstream discharge slots wherein the sliding deck is slid aft to an aft position when the upstream slot is opened and the downstream slot is closed and the sliding deck is slid forward to a forward position when the upstream slot is closed and the downstream slot is opened.

22. An engine as claimed in claim 18 further comprising the valve including a sliding deck operable for sliding up and down for opening and closing the upstream and downstream discharge slots wherein the sliding deck is slid down to a lower position when the upstream slot is opened and the downstream slot is closed and the sliding deck is slid up to an upper position when the upstream slot is closed and the downstream slot is opened.

23. A method of operating an aircraft gas turbine engine comprising:
operating the engine to rotate a fan section and at least one row of FLADE fan blades disposed radially outwardly of and drivingly connected to a fan in the fan section,
directing FLADE airflow from a FLADE duct circumscribing the fan section wherein the row of FLADE fan blades radially extend across the FLADE duct to a two dimensional flow FLADE air discharge fluid passage in fluid flow communication with the FLADE duct, and
opening and closing FLADE air upstream and downstream discharge slots in fluid flow communication with the two dimensional flow FLADE air discharge fluid passage and disposed in a divergent flap of a two dimensional nozzle, and
fully closing the upstream slot when the downstream slot is fully opened and fully opening the upstream slot when the downstream slot is fully closed.

24. A method as claimed in claim 23 further comprising the upstream and downstream slots located upstream and downstream of a nozzle discharge area in the two dimensional nozzle.

25. A method as claimed in claim 24 further comprising: the two dimensional nozzle being a two-dimensional single expansion ramp nozzle, the divergent flap being a lower divergent flap of a divergent section of the two-dimensional single expansion ramp nozzle, and the FLADE air upstream and downstream discharge slots disposed in the lower divergent flap of the divergent section and in fluid flow communication with the two dimensional flow FLADE air discharge fluid passage.

26. A method as claimed in claim 25 further comprising the upstream and downstream slots located upstream and downstream of a nozzle discharge area in the two dimensional nozzle.

27. A method as claimed in claim 26 further comprising: the opening and closing the upstream and downstream discharge slots includes positioning a sliding deck operable for sliding aft and forward for opening and closing the upstream and downstream discharge slots, sliding the sliding deck aft to an aft position when the upstream slot is opened and the downstream slot is closed, and sliding the sliding deck forward to a forward position when the upstream slot is closed and the downstream slot is opened.

28. A method as claimed in claim 26 further comprising: the opening and closing the upstream and downstream discharge slots includes positioning a sliding deck operable for sliding up and down for opening and closing the upstream and downstream discharge slots, sliding the sliding deck down to a lower position when the upstream slot is opened and the downstream slot is closed, and sliding the sliding deck up to an upper position when the upstream slot is closed and the downstream slot is opened.

29. A method as claimed in claim 26 further comprising fully opening the upstream slot and fully closing the downstream slot when operating the engine in a lower nozzle pressure ratio mode of operation and fully closing the upstream slot and fully opening the downstream slot when operating the engine in a higher nozzle pressure ratio mode of operation.

30. A method as claimed in claim 29 further comprising the lower nozzle pressure ratio mode of operation being cruise and the higher nozzle pressure ratio mode of operation being afterburning by burning fuel in an afterburner upstream of the two-dimensional single expansion ramp nozzle.

31. A method as claimed in claim 30 further comprising:
the opening and closing the upstream and downstream discharge slots includes positioning a sliding deck operable for sliding aft and forward for opening and closing the upstream and downstream discharge slots,
sliding the sliding deck aft to an aft position when the upstream slot is opened and the downstream slot is closed, and
sliding the sliding deck forward to a forward position when the upstream slot is closed and the downstream slot is opened.

32. A method as claimed in claim 30 further comprising:
the opening and closing the upstream and downstream discharge slots includes positioning a sliding deck operable for sliding up and down for opening and closing the upstream and downstream discharge slots,
sliding the sliding deck down to a lower position when the upstream slot is opened and the downstream slot is closed, and
sliding the sliding deck up to an upper position when the upstream slot is closed and the downstream slot is opened.

* * * * *

UNITED STATES PATENT AND TRADEMARK OFFICE
CERTIFICATE OF CORRECTION

PATENT NO. : 8,984,891 B2  Page 1 of 1
APPLICATION NO. : 12/982265
DATED : March 24, 2015
INVENTOR(S) : Lariviere et al.

It is certified that error appears in the above-identified patent and that said Letters Patent is hereby corrected as shown below:

In the Drawings

Fig. 4, Drawing Sheet 2 of 3, delete " 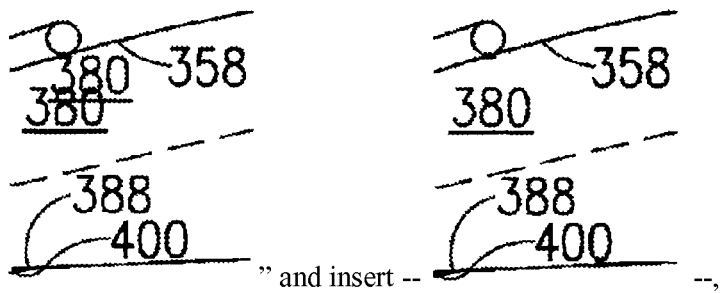 " and insert -- -- , therefor.

In the Claims

Column 10, Line 21, Claim 23, delete "duct, and" and insert -- duct, -- , therefor.

Signed and Sealed this
First Day of September, 2015

Michelle K. Lee
*Director of the United States Patent and Trademark Office*